US008374278B2

(12) United States Patent
Sakata et al.

(10) Patent No.: US 8,374,278 B2
(45) Date of Patent: *Feb. 12, 2013

(54) TRANSMISSION METHOD, TRANSMITTER, AND RECEIVER FOR MULTI ANTENNA WIRELESS COMMUNICATION SYSTEM

(75) Inventors: Ren Sakata, Yokohama (JP); Koji Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,289

(22) Filed: Dec. 23, 2011

(65) Prior Publication Data

US 2012/0099668 A1    Apr. 26, 2012

Related U.S. Application Data

(63) Continuation of application No. 11/838,255, filed on Aug. 14, 2007, now Pat. No. 8,116,398, which is a continuation of application No. PCT/JP2007/061506, filed on May 31, 2007.

(30) Foreign Application Priority Data

Aug. 14, 2006  (JP) .................................. 2006-221029

(51) Int. Cl.
    *H04B 7/02* (2006.01)
(52) U.S. Cl. ........ 375/267; 375/260; 375/219; 375/295; 375/299; 375/316; 375/343; 375/346; 375/349
(58) Field of Classification Search .................. 375/267, 375/260, 219, 295, 299, 316, 343, 346, 349
See application file for complete search history.

(56) References Cited

U.S. PATENT DOCUMENTS

| 7,379,477 | B2 * | 5/2008 | Oh et al. ........................ 370/480 |
| 7,436,903 | B2 * | 10/2008 | Sandhu et al. ................. 375/315 |
| 7,508,842 | B2 * | 3/2009 | Baum et al. .................... 370/468 |
| 7,801,179 | B2 * | 9/2010 | Nakao ............................ 370/473 |
| 2006/0013186 | A1 * | 1/2006 | Agrawal et al. ............... 370/344 |
| 2006/0050799 | A1 | 3/2006 | Hou et al. |

(Continued)

FOREIGN PATENT DOCUMENTS

JP     2007-82189       3/2007
WO  WO 2004/102816 A2  11/2004

(Continued)

OTHER PUBLICATIONS

Liang Zhou, et al., "Channel Estimation of Multiple Transmit Antennas for OFDM Systems with Cyclic Delay Preamble", Vehicular Technology Conference, XP-010878538, Sep. 28, 2005, pp. 583-587.

(Continued)

*Primary Examiner* — Sam K Ahn
*Assistant Examiner* — Sophia Vlahos
(74) *Attorney, Agent, or Firm* — Oblon, Spivak, McClelland, Maier & Neustadt, L.L.P.

(57) ABSTRACT

A transmitter includes first generator to generate pilot source signal by modulating pilot sequence, second generator to generate data source signal with time length longer than that of pilot source signal by modulating data sequence, first cyclic shifter to perform cyclic shift of first shift amount to pilot source signal to generate first pilot signal, second cyclic shifter to performs cyclic shift of second shift amount to data source signal to generate first data signal, third cyclic shifter to perform cyclic shift of third shift amount to pilot source signal to generate second pilot signal, fourth cyclic shifter to perform cyclic shift of fourth shift amount to data source signal to generate second data signal, first transmit antenna to transmit first pilot signal and first data signal, and second transmit antenna to transmit second pilot signal and second data signal.

13 Claims, 12 Drawing Sheets

U.S. PATENT DOCUMENTS

| | | | |
|---|---|---|---|
| 2006/0067421 | A1 | 3/2006 | Walton et al. |
| 2006/0077886 | A1 | 4/2006 | Oh et al. |
| 2007/0041311 | A1 | 2/2007 | Baum et al. |
| 2007/0097946 | A1 | 5/2007 | Mujtaba |
| 2007/0195906 | A1* | 8/2007 | Kim et al. ............ 375/267 |
| 2007/0206686 | A1* | 9/2007 | Vook et al. ............ 375/260 |

FOREIGN PATENT DOCUMENTS

| | | |
|---|---|---|
| WO | WO 2005/081480 A1 | 9/2005 |
| WO | WO 2005/119922 A2 | 12/2005 |

OTHER PUBLICATIONS

Wenzhen, Li, et al., "A New Receiver Architecture for Joint Carrier, Channel, and Data Estimation for High-rate WPAN Systems", VTC 2002—Fall.2002 IEEE 56th. Vehicular Technology Conference Proceedings, vol. 1 of 4, Conf. 56, XP-010608706, Sep. 24, 2002, pp. 1637-1641.

G. Bensberg, et al., "The Development of an Upgraded Spectre Moden for UK Based Field Trials and Tests", International Broadcasting Convention, XP-006528914, 1995, pp. 109-116.

Gerhard Bauch, et al., "Parameter Optimization, Interleaving and Multiple Access in OFDM with Cyclic Delay Diversity", Vehicular Technology Conference 2004 Spring, vol. 1, pp. 505-509.

Japanese Office Action mail date Feb. 8, 2011, with English translation.

LG Electronics, Uplink Multiple Access Scheme, 3GPP TSG RAN WG1 Ad Hoc on LTE, 3GPP, Jun. 5, 2005, p. 5.

Office Action issued in Japanese Patent Application No. 2006-221029 on Oct. 4, 2011.

LG Electronics, Uplink Multiple Access scheme, 3GPP TSG RAN WG1 Ad Hoc on LTE, 3GPP, Jun. 15, 2005, RI-050638.

* cited by examiner

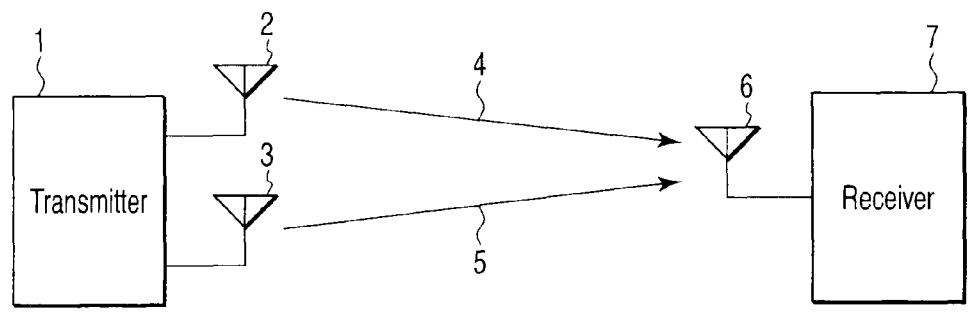
F I G. 1
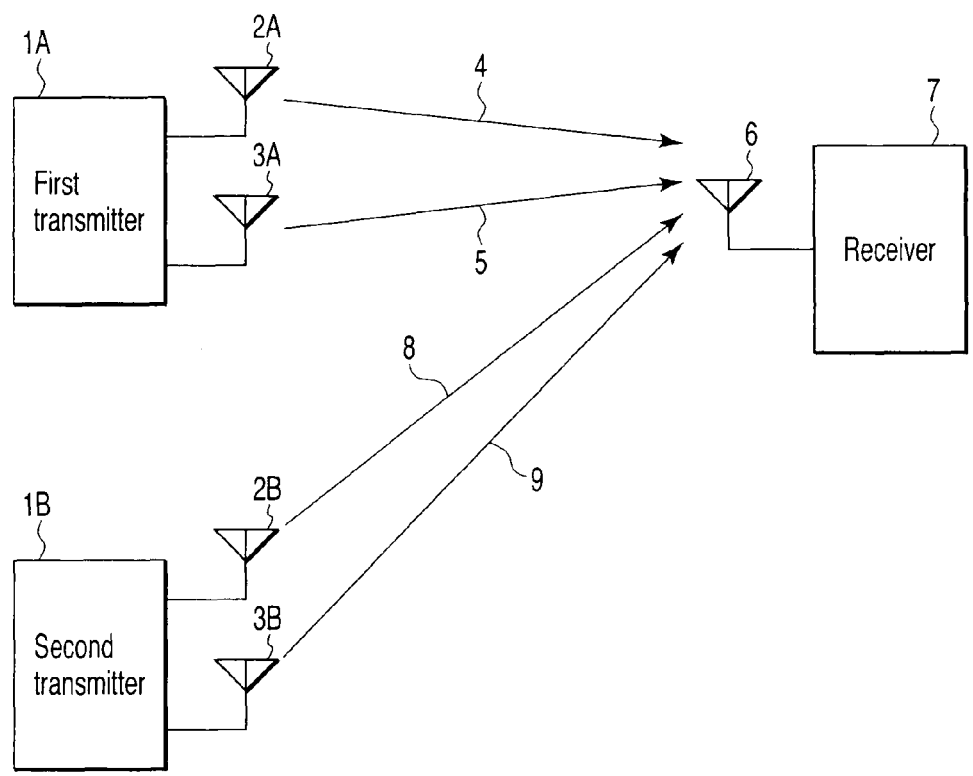
F I G. 2

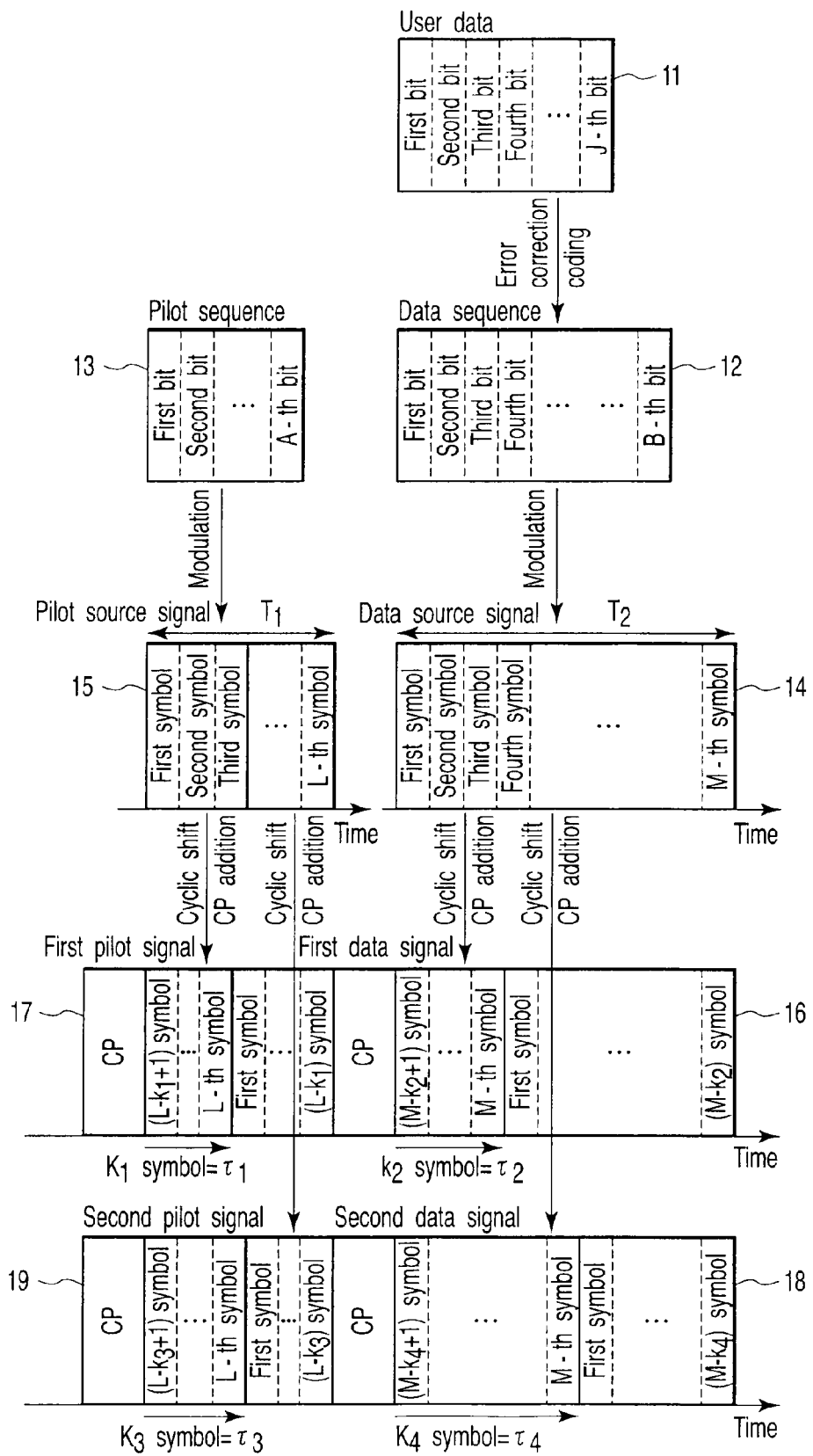
F I G. 5

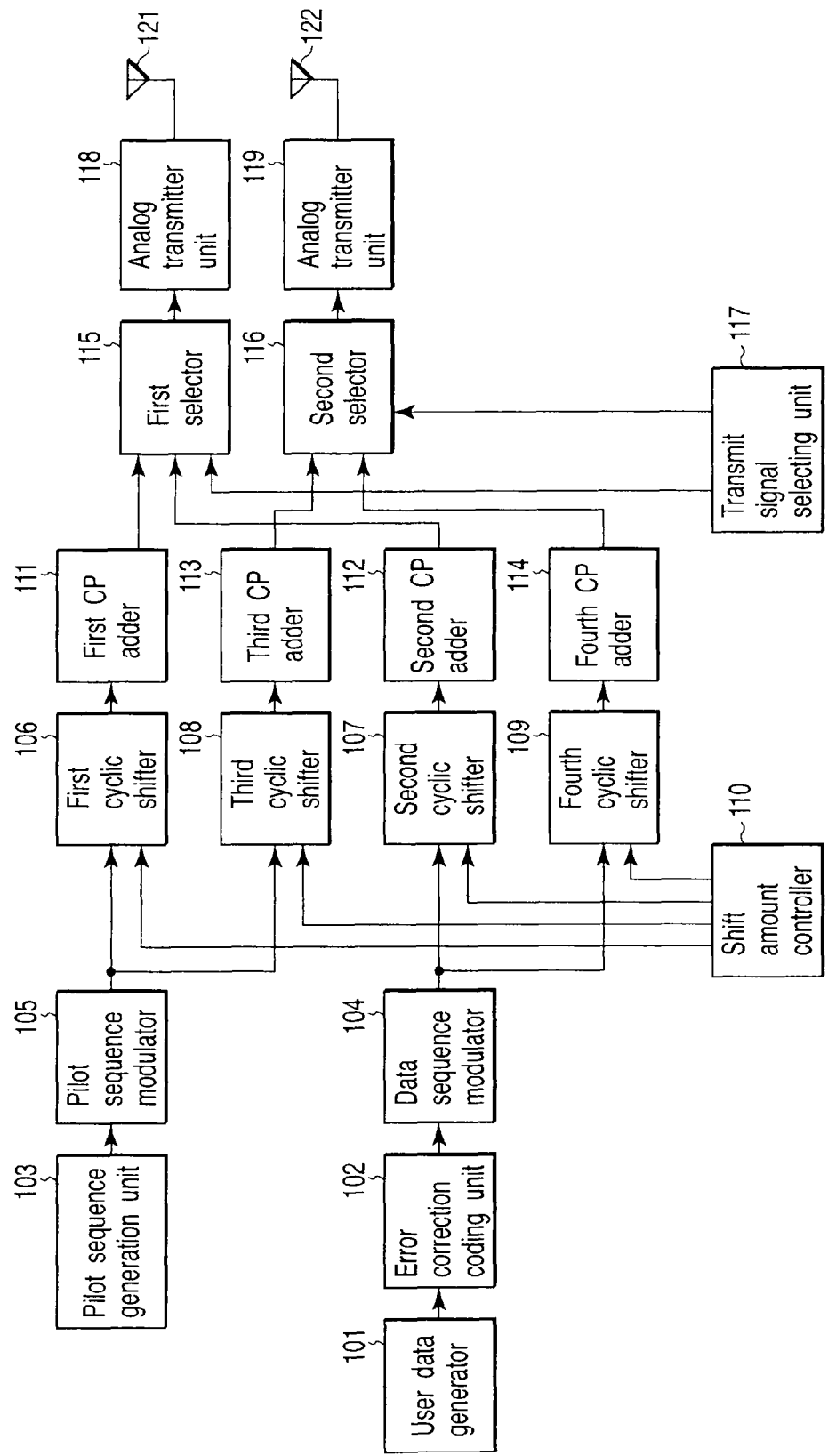
F I G. 8

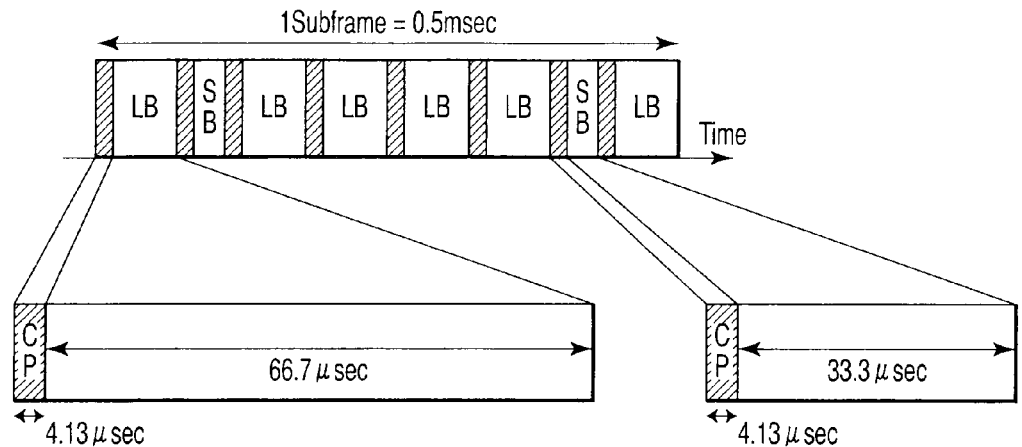
F I G. 14
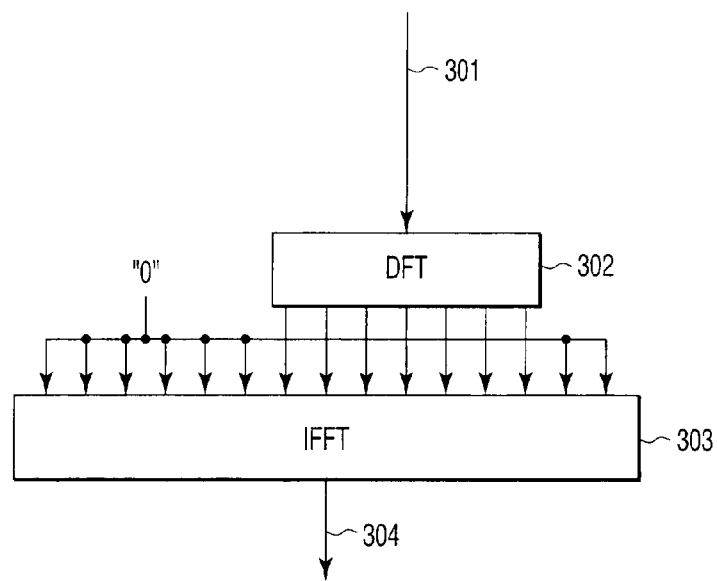
F I G. 15 under PCT Article 21(2) in
TRANSMISSION METHOD, TRANSMITTER, AND RECEIVER FOR MULTI ANTENNA WIRELESS COMMUNICATION SYSTEM

CROSS REFERENCE TO RELATED APPLICATIONS

This is a Continuation of U.S. application Ser. No. 11/838,255, filed Aug. 14, 2007, which is a Continuation Application of PCT Application No. PCT/JP2007/061506, filed May 31, 2007, which was published English.

This application is based upon and claims the benefit of priority from prior Japanese Patent Application No. 2006-221029, filed Aug. 14, 2006. The entire contents of U.S. application Ser. No. 11/838,255 and Japanese Patent Application No. 2006-221029 are incorporated herein by reference.

BACKGROUND OF THE INVENTION

1. Field of the Invention

The present invention relates to a transmission method, a transmitter and a receiver for a multi antenna wireless communication system using cyclic delay diversity.

2. Description of the Related Art

Transmit antenna diversity that is one of transmit diversity techniques for wireless communication transmits the same signals from a plurality of antennas. As for the transmit antenna diversity, space time block coding (STBC) which makes transmission data blocks, operates its code, and changes the transmission order then transmits data; and cyclic delay diversity (CDD) which simultaneously transmits signals subjected to cyclic shift for blocks have been well known.

In the CCD, as described, for example, in G. Bauch and J. S. Malik, "Parameter optimization, interleaving and multiple access in OFDM with cyclic delay diversity," VTC-2004 spring, Vol. 1, pp. 505-509 (2004) (hereinafter, referred to as Document 1), a transmitter transmits data signal from one antenna, and also it transmits the same data signal with the cyclic shift performed thereto from other antennas. In a receiver, the data signals transmitted from each antenna of the transmitter are mixed and received.

Cyclic-shifted signals have high velocity phase rotation in frequency domain. Therefore, mixing the cyclic-shifted signals with the not cyclic-shifted signals makes frequencies intensifying the signals mutually and frequencies weakening the signals mutually on a frequency domain at short frequency intervals. Thereby, the CCD eliminates burst power drop in the frequency directions. Therefore, if error correction coding has been implemented as well as transmission data has fully interleaved in the frequency directions, the CCD may fully exert error correction ability in the receiver, and may expect improving reception performance.

In the technique in the Document 1, the CCD requires an amplitude reference and phase reference for demodulating a spectrum varying with a high velocity in the frequency domain in order to demodulate received signals. The transmitter has to transmit pilot signals defied in a system to estimate channels from a plurality of antennas prior to the data signals.

Each pilot signal being a redundant signal not directly contributing to a data transmission, the use of the pilot signals with long time lengths causes a reduction in transmission efficiency of data. Therefore, a short pilot signal length (time length) is desired. However, although the Document 1 refers to a cyclic shift amount of the data signal, it does not refer to a cyclic shift amount of the pilot signal and the pilot signal length.

The object of the present invention is to shorten a pilot signal length as much as possible while enjoying an effect of the CDD to improve the data transmission efficiency.

BRIEF SUMMARY OF THE INVENTION

According to an aspect of the present invention, a transmitter comprising: a first generator which generates a pilot source signal by modulating a pilot sequence; a second generator which generates a data source signal with a time length longer than that of the pilot source signal by modulating a data sequence; a first cyclic shifter which performs a cyclic shift of a first shift amount to the pilot source signal to generate a first pilot signal; a second cyclic shifter which performs a cyclic shift of a second shift amount to the data source signal to generate a first data signal; a third cyclic shifter which performs a cyclic shift of a third shift amount to the pilot source signal to generate a second pilot signal; a fourth cyclic shifter which performs a cyclic shift of a fourth shift amount to the data source signal to generate a second data signal; a first transmit antenna which transmits the first pilot signal and the first data signal; and a second transmit antenna which transmits the second pilot signal and the second data signal is provided.

BRIEF DESCRIPTION OF THE SEVERAL VIEWS OF THE DRAWING

FIG. 1 is an exemplary block diagram depicting a wireless communication system according to one embodiment;

FIG. 2 is another exemplary block diagram depicting the wireless communication system according to the embodiment;

FIG. 5 is an exemplary view depicting a transmit signal generation procedure in the embodiment;

FIG. 8 is an exemplary block diagram depicting a transmitter according to the embodiment;

FIG. 14 is an exemplary schematic view depicting a frame structure of a transmit signal;

FIG. 15 is an exemplary block diagram depicting a specific example of a part of the transmitter;

DETAILED DESCRIPTION OF THE INVENTION

Figure 3:
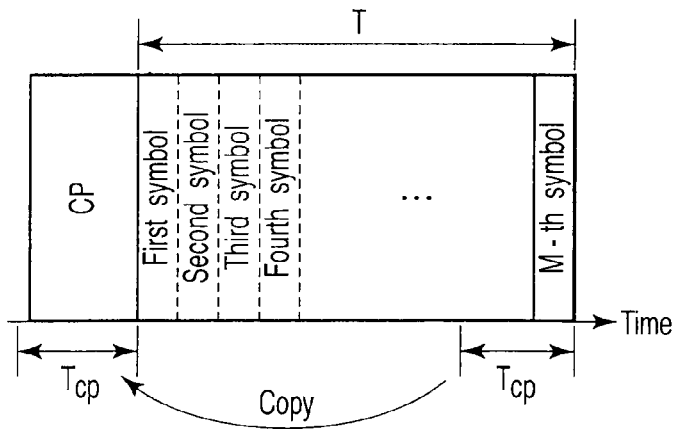
FIG. 3 is an exemplary schematic view depicting a transmit signal format in the embodiment.

Hereinafter, embodiments of the present invention will be described with reference to the drawings.

(Wireless Communication System)

A wireless communication system regarding one example of the invention will be set forth by referring to FIG. 1. A transmitter 1 has a first transmit antenna 2, and a second transmit antenna 3. A receiver 7 has a receive antenna 6. A system in FIG. 1 is typically used for a cellular communication system, but it is not limited to such a system. It is also possible for the system in FIG. 1 to be applied to a wireless LAN, a fixed wireless access network, etc.

The transmitter 1 has a function to modulate user data to convert it into a radio frequency (RF) signal in order to transmit the user data to the receiver 7 wirelessly. The transmitter 1 performs transmit diversity by transmitting the RF signal from both the first and second transmit antennas 2 and 3.

The RF signal transmitted from the first and the second transmit antennas 2 and 3 arrives at the receive antenna 6 of the receiver 7 through first and second channels (propagation paths) 4 and 5. If both the first and second channels 4 and 5 are multipath channels, a maximum delay time (maximum transmission delay time) from the path though which the first signal achieves the receive antenna 6 up to the path through which the last signal achieves there is presumed within $T_3$.

The receive antenna 6 receives a signal in which the signal transmitted from the first transmit antenna 2 and the signal transmitted from the second transmit antenna 3 are mixed. The receiver 7 performs a demodulation process to the received signal from the receive antenna 6 to reproduce the user data.

FIG. 2 illustrates another wireless communication system regarding the embodiment of the invention. In FIG. 1, the transmitter being present only one set, the system in FIG. 2 includes a plurality of transmitters, for instance, a first transmitter 1A and a second transmitter 1B. It is supposed that, in general, different users use each transmitter 1A and 1B, which transmits different user data, respectively. Each transmitter 1A and 1B have first transmit antennas 2A and 2B, and second transmit antennas 3A and 3B, respectively. The signals transmitted from the antennas 2A and 3A of the first transmitter 1A arrive at the receive antenna 6 passing through the first and the second channels 4 and 5, respectively. The signals transmitted from the antennas 2B and 3B of the second transmitter 1B arrive at the receive antenna 6 passing through a third and a fourth channels (propagation paths) 8 and 9, respectively. It is assumed that the maximum transmission delay time of the channels 4, 5, 8 and 9 is $T_3$.

The receiver 7 has to separate the signals transmitted from the first and the second transmitters 1A and 1B. Therefore, in this embodiment, the data signals transmitted from the first and the second transmitters 1A and 1B are transmitted though different frequencies, respectively. That is, it is presumed that frequency division multiplexing (FDM) is performed. In this case, it may be supposed for the demodulation within a frequency band through which the data signals of one user is transmitted to be conducted a process similar to that of the system configuration shown in FIG. 1.

(Transmit Signal Format)

FIG. 3 illustrates a format of a transmit signal transmitted from a transmitter. The transmit signal has a form of a single carrier signal, namely, a form in which transmission symbols generated by the modulation of the data signals are made a line linearly in a time direction. One signal block is constituted with a consecutive plurality of transmission symbols; a signal of a time $T_{CP}$ equivalent to an end of a certain signal block is copied and connected to a head of the signal block. In an example in FIG. 3, the one signal block length is a time T and M pieces of modulated symbols are arranged. A part added to the head is generally called a cyclic prefix (hereinafter referred to CP) and added so as to enable frequency domain equalization in the receiver.

The signals transmitted from the transmitter are mainly classified into two types. One is a pilot signal used so that the receiver predicts conditions in the channels. The other is a data signal made by modulating the user data. Each signal is presumed to each occupy one block, and it is supposed that the pilot signal and the data signal for one receiver are transmitted with time division multiplexing (TDM) implemented. However, it is not limited to the TDM; for instance, code division multiplexing (CDM) and FDM are also applicable to the present embodiment.

The receiver extracts a section of the time T from the one signal block to be received, and converts the extracted signal into a signal in a frequency domain through fast Fourier transform (FFT), etc. A start point of the section to be extracted is selected from a CP. Setting the section to be extracted to the latter position of the CP enables to prevent the mixture of delayed waves of the precedent signal block. In addition to this, the CP having been cyclically added to the original modulated signal, the extracted signal of the time T is also assured its continuity at both ends.

For the pilot signal, for instance, a sequence called a constant amplitude and zero auto correction (CAZAC) sequence is utilized. The CAZAC sequence has a constant envelope, and is a sequence further having a character of which the autocorrelation value becomes "0" other that at a delayed time "0", that is, a sequence having a complete autocorrelation property. The CAZAC sequence having the constant envelope, it may reduce back off to prevent distortion of a transmission amplifier, etc. Depending on the perfect autocorrelation property of the CAZAC sequence, code multiplexing by using the CAZAC sequence which has cyclically sifted in terms of time is available.

In the embodiment, the data signals having been subjected to the FDM, as to the pilot signal, the cyclic shift of the CAZAC sequence generates signals orthogonal among users to achieve code multiplexing among the users. That is to say, the system in the embodiment generates a pilot signal A in a certain CAZAC sequence shown in FIG. 4A, and a pilot signal B which is made by cyclically shifting the pilot signal A by time $T_3$ and shown in FIG. 4B. Transmission block generation by adding the CP is omitted in FIGS. 4A and 4B.

Figure 4A:
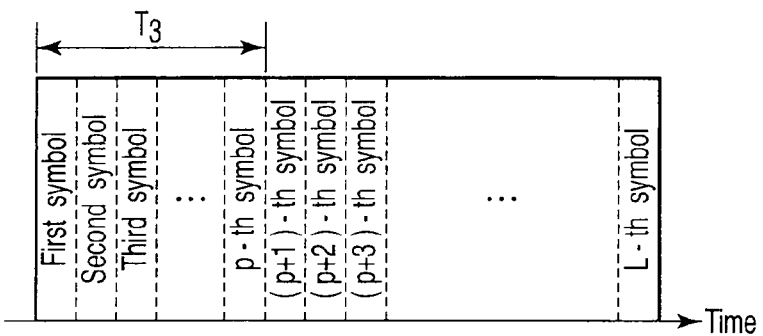
FIG. 4A is an exemplary schematic view depicting a pilot signal of a constant amplitude and zero auto correction (CAZAC) sequence in the embodiment.
Figure 4B:
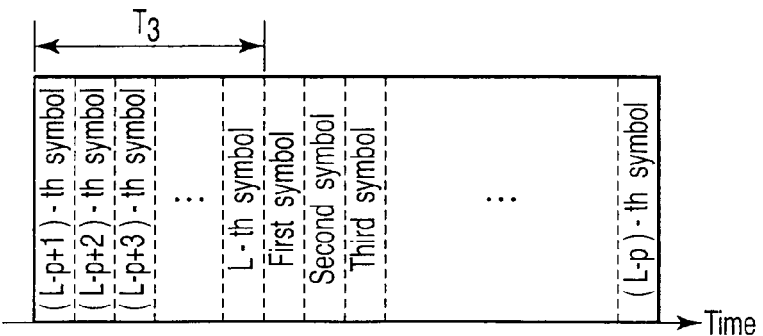
FIG. 4B is an exemplary schematic view depicting a cyclic-shifted pilot signal on the basis of the pilot signal in FIG. 4A.

The pilot signals A and B are mutually orthogonal due to the property of the CAZAC sequence. The maximum propagation delay time of the channels are within the time $T_3$, two sets of transmitters transmit the pilot signals A and B, respectively, even if the maximum delayed waves have arrived at the receiver, the delayed wave of the pilot signal A does not overlap on a faster-most arrival wave of the pilot signal B. FIGS. 4A and 4B having illustrated only two sequences as examples, generating sequences by sifting the pilot signal A by $2T_3, 3T_3, 4T_3, \ldots$, the system can generate a plurality of sequences until the cyclic shift will make a round.

(Generation Procedure of Transmit Signal)

A generation procedure of a transmit signal in the present embodiment will be described in detail with reference to FIG. 5. The transmit signal includes pilot signals to measure impulse responses (or frequency characteristics) of the first and the second channels and data signal which has mad by modulating the user data.

The pilot signals are generated by modulating a pilot sequence 13 that is a CAZAC sequence of A bit. A modulation scheme is desirable to be preset between the transmitter and receiver, for example, binary modulation, such as binary phase shift keying (BPSK) or amplitude shift keying (ASK) are used appropriately. With modulation, the pilot sequence is converted into a pilot source signal 15. A time length of the pilot source signal 15 is $T_1$. If it is presumed that L symbols are generated by modulation, for instance, in the case of implementation of BPSK modulation, L equals to A.

The cyclic shift and CP addition are performed to the pilot source signal 15. It is supposed that the way of being performed the cyclic shifts, especially, cyclic shift amounts varied depending on the transmit antennas. The signal transmitted from the first transmit antenna is subjected to the cyclic shift by $k_1$ symbol or time $\tau_1$ equivalent to the $k_1$ symbol. The cyclic shift is the same process as a cyclic replacement. That is, the cyclic shift is a replacement process not varying an information amount to be transmitted by shifting the part which has become longer than the source signal due to a delay processing as well as adding a delay to the signal. After performing the cyclic shift like this manner, the CP is added in a method shown in FIG. 3.

A cyclic shift with different time from that of the signal transmitted from the first transmit antenna is given to the pilot signal transmitted from the second transmit antenna. It is presumed that the cyclic shift amount of the pilot signal transmitted from the second transmit antenna is equal to a $k_3$ symbol, or a time $\tau_3$ equivalent to the $k_3$ symbol. After the cyclic shift, the CP is added. The cyclic-shifted pilot signal transmitted from the first transmit antenna is referred to as a first pilot signal, and the cyclic-shifted pilot signal transmitted from the second transmit antenna is referred to as a second pilot signal. The first and the second pilot signals are transmitted from each antenna simultaneously.

Next, a generation procedure of the data signal will be described. The transmitter generates user data 11 of J bit. Performance of error correction coding (ECC) to the user data 11 generates a data sequence 12 of B bit. Further, the system modulates the data sequence 12 to generate a data source signal 14 with M pieces of symbols and with time length $T_2$. For the modulation here, for instance, a modulation scheme, such as a BPSK, quadrature amplitude modulation (QPSK), 16 QAM, and 64 QAM is usable. It is supposed that the modulation scheme used here has been preset between the transmitter and receiver, or notified from the transmitter to the receiver in another method.

As like the pilot signal, two types of cyclic shifts differing in shift amount are performed to the data source signal 14. A first data signal 16 transmitted from the first transmit antenna is a signal in which a cyclic shift is performed to the data source signal 14 by $k_2$ symbol, or by $time_2$ equivalent to the $k_2$ symbol, and the CP is further added.

Similarly, a second data signal 17 transmitted from the second transmit antenna is a signal made by performing a cyclic shift to the data source signal 14 by $k_4$ symbol, or by time $\tau_4$ equivalent to the $k_4$ symbol, and by further adding the CP. The first and the second data signals 16 and 17 are transmitted simultaneously from each transmit antenna.

In this embodiment, not to lose generality, it is assumed that $\tau_1 < \tau_3$, and $\tau_2 < \tau_4$. Here, making difference between the difference $\tau_3 - \tau_1$ of the cyclic shift amounts between the first pilot signal and the second pilot signal from the difference $\tau_4 - \tau_2$ of the cyclic shift amounts between the first pilot signal and the second pilot signal produces the following advantages.

In the cyclic shift, if the shift amount exceeds a transmission block length, the signal being shifted more than one round; it is a possible risk for the shift amount becomes the same sequence as a sequence with a length shorter than the transmission block length. Accordingly, the cyclic shift amounts of the first and the second pilot signals 17 and 19 are smaller than $T_1$, and the cyclic sift amounts of the first and the second data signals 16 and 18 have to set smaller than $T_2$. This expresses at the same time that the difference $\tau_3 - \tau_1$ has to be smaller than $T_1$, and the difference $\tau_4 - \tau_2$ has to be smaller than $T_2$.

Here, if the difference $\tau_3 - \tau_1$ equals to the difference $\tau_4 - \tau_2$, the time length $T_1$ and $T_2$ inevitably has to be larger than both the difference $\tau_3 - \tau_1$ and the difference $\tau_4 - \tau_2$. Then, for instance, the case, in which the system cannot always satisfy the desire to make the time length $T_1$ of the first and the second pilot signals 17 and 19 smaller than the time length $T_2$ of the first and the second data signals 16 and 18, occurs. More specifically, it is impossible to make the time length $T_1$ of the first and the second pilot signals 17 and 19 smaller than the difference $\tau_4 - \tau_2$ of the first and the second data signals 16 and 18. The pilot signals are redundant signals not contributing directly to the transmission of the user data. Therefore, if the system cannot shorten the pilot signal lengths, the case of excess transmissions of the redundant signals occurs, and the system has to further shorten the data signal lengths and poses the reduction in transmission rate, or saturation at a slow transmission rate.

Here, like the embodiment, if it is assumed that the difference $\tau_3 - \tau_1$ and the difference $\tau_4 - \tau_2$ are different from each other, or they are set separately, the time length $T_1$ is enough to be the difference $\tau_3 - \tau_1$ or more, and the time length $T_2$ is enough to be the difference $\tau_4 - \tau_2$ or more Then, the time length $T_1$ is not restricted by the value of the difference $\tau_4 - \tau_2$, the pilot signal lengths become possible to be set shorter. Accordingly, the system decreases its redundancy, increases the user data amount which can transmit of the reduction due to the decrease, and results in improving the transmission rate.

Further, in the embodiment, when the difference $\tau_4 - \tau_2$ equals to the time length $T_2/2$, the effect of the CDD becomes maximum. Here, if the difference $\tau_3 - \tau_1$ equals to the difference $\tau_4 - \tau_2$, the time length $T_1$ has to be set larger than the time length $T_2/2$. Strictly speaking, the delayed waves of maximum time length $T_3$ are occurred in the channels, so that the time length T1 has to be set longer than the time length in which the time length T3 is added to the time length $T_2/2$. However, according to the embodiment, if the difference $\tau_3 - \tau_1$ is set smaller than the time length subtracting $T_3$ from $T_2/2$, the time length $T_1$ may be within a range larger than the difference $\tau_3 - \tau_1$. For example, if $T_1 = T_2/2$ is satisfied, the time length $T_1$ of the pilot source signal 15 becomes a half of the time length $T_2$ of the data source signal 14. Thereby, the system easily performs memory management of the transmitter, further, the system becomes possible to have an advantage on mounting, because the FFT for the frequency compensation in the receiver. At this time, the effect of the CDD is not spoiled.

(Reception Method)

Outline of a reception operation in the present embodiment will be explained by referring to FIG. 6. The first transmit antenna 2 of the transmitter 1 transmits the first pilot signal 17 cyclic-shifted by the time $\tau_1$ and the first data signal 16 cyclic-shifted by the time $\tau_2$ following the time $\tau_1$. At the same time, the second antenna 3 transmits the second pilot signal 19 cyclically shifted by the time $\tau_3$, and the second data signal 18 cyclically shifted by the time $\tau_4$.

The signals transmitted from the first and the second transmit antennas 2 and 3 are mixed and received at the receive antenna 6 through the first channel 4 and the second channel 5 with the maximum delay time $T_3$. The pilot signals are those in the CAZAC sequence, by obtaining a correlation to the pilot source signal 15 for the first and the second pilot signals 17 and 19 mixed at the receive antenna, the system can obtain impulse responses of the first and the second channels 4 and 5.

The impulse response of the first channel 4 is referred to as a first impulse response, and the impulse response of the second channel 5 is referred to as a second impulse response. In FIG. 6, examples of each shape of the first and the second impulse responses are shown, respectively. It is thought to equalize the signal in which the first and second data signals 16 and 18 transmitted from the first and second transmit antennas 2 and 3 are mixed, namely, to compensate its distortion by using these impulse responses. To equalize the mixed data signals, it is necessary to obtain the impulse response mixed after sifting by the same amount of that of the data signals. A generation method of the impulse responses will be described by referring to FIG. 7.

To generate the impulse response to equalize the signals made by mixing the first and second data signals 16 and 18, the system rearrange the first and second impulse responses in the section of the time $T_2$.

If the first arrival time of the first data signal is set to $t_2$, the first impulse response is arranged at a position away by the time $\tau_2$ from the time $t_2$. The second impulse response is arranged at a position away by the time $\tau_4$ from the time $t_2$. The foregoing rearrangement process is called a profile adjustment. The system can obtain the impulse response having the same shift amount as that of the data signal by the profile adjustment, and it can use the impulse response to compensate the distortion of the received data signal.

(Transmitter)

The transmitter regarding the present invention will be described by referring to FIG. 8. The transmitter in FIG. 8 comprises a pilot sequence generator 103, a pilot sequence modulator 105, a user data generator 101, an error correction coding unit 102, a data sequence modulator 104, first to fourth cyclic shifters 106-109, a sift amount controller 110, first to fourth CP adders 111-114, a transmit signal selecting unit 117, first and second selectors 115 and 116, analog transmitter units 118 and 119, and first and second transmit antennas 121 and 122.

The pilot sequence generator 103 generates a pilot sequence preset between the transmitter and receiver. In the embodiment, the pilot sequence is presumed as the CAZAC sequence. The generated pilot sequence is supplied to the pilot sequence modulator 105.

The pilot sequence modulator 105 performs prescribed modulation to the pilot sequence generated from the sequence generator 103 to generate the pilot source signal 15. The generated pilot source signal 15 is supplied to the first cyclic shifter 106 and the third cyclic shifter 108.

The user data generator 101 generates the user data to be transmitted to the receiver 7. The user data generated from the user data generator 101 is supplied to the coding unit 102. The coding unit 102 performs error correction coding to the user data obtained from the generator 101. The coding may use, for instance, convolution coding, turbo coding, etc. The encoded data is a data sequence 12 shown in FIG. 2, and it is supplied to the data sequence modulator 104 so as to be modulated.

The data sequence modulator 104 modulates the data sequence from the coding unit 102. As for a modulation scheme, for example, the BPSK, QPSK, 16 QAM, or 64 QAM is usable. The modulation scheme used here is supposed to be shared between the transmitter 1 and receiver 7. The generated signal is the data source signal 14 shown in FIG. 5, and applied to the second cyclic shifter 107 and fourth cyclic shifter 109.

The first to fourth cyclic shifter 106-109 performs cyclic shifts to the input pilot source signal 15 or data source signal 14. The cyclic shift amount is given from the controller 110. The cyclic-shifted signals are applied to the first to fourth CP adders 111-114.

The controller 110 sets cyclic shift amounts to the first to fourth cyclic shifters 106-109. More specifically, the controller 110 sets the cyclic shift amounts of each $\tau_1$, $\tau_2$, $\tau_3$, and $\tau_4$ to the first to fourth cyclic shifters 106-109, respectively. To obtain a maximum diversity effect in the CDD, as examples for the setting of the times $\tau_1$, and $\tau_2$, it is preferable for $\tau_4-\tau_2$, to be a half of the block length $T_2$ of the data signal. As an example for the setting of the $\tau_1$, and $\tau_3$, when a plurality of users transmit pilot signals simultaneously as shown in FIG. 2, the system sets so that the $\tau_1$, and $\tau_3$ do not become the same cyclic shift amounts of the other pilot signals.

The CP adders 111-114 add CPs to each signal cyclically shifted by the cyclic shifters 106-109. All operations of the first to fourth CP adders 111-114 are identical, only their output destinations are different from one another. Outputs from the first to fourth CP adders 111-114 are connected to the first and second selectors 115 and 116, respectively.

The first selector 115 supplies either the first pilot signal obtained from the first CP adder 111 or the first data signal obtained from the second CP adder to the succeeding first analog transmitter unit 118. Similarly, the second selector 116 supplies either the second pilot signal obtained from the third CP adder 113 or the second data signal obtained from the fourth CP adder to the succeeding second analog transmitter unit 119. The transmit signal selecting unit 117 instructs each selector 115 and 116 so as to decide which signal should be output the succeeding states.

The selecting unit 117 instructs the two selectors 115 and 116 either the pilot signals or data signals should be applied to the analog transmitter units 118 and 119. That is to say, it instructs so as to apply the pilot signals at the transmission times thereof, and apply the data signals at the time transmission times of the data signals. The first and second pilot signals 17 and 19 are sent simultaneously, and the first and second data signals 16 and 18 are also sent simultaneously. The pilot signals 17 and 19 and the data signals 16 and 18 are transmitted at different times, respectively.

The analog transmitter units 118 and 119 convert the transmit signals output from the selectors 115 and 116 into RF signals, respectively, and output them to the first and second transmit antennas 121 and 122, respectively. The first and the second transmit antennas 121 and 122 transmit the RF signals output from the analog transmitter units 118 and 119 to the channels.

(Receiver)

Figure 9:
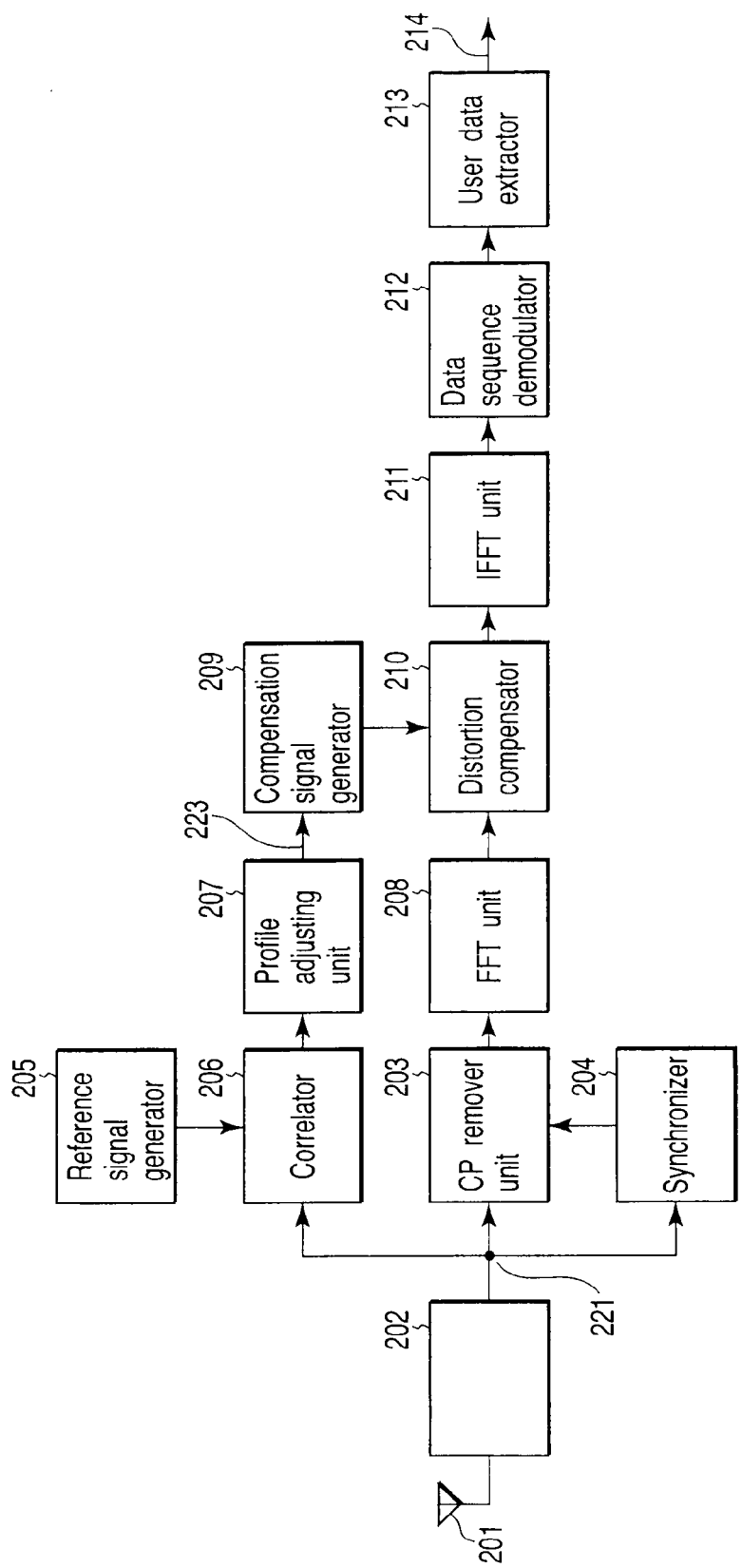
FIG. 9 is an exemplary block diagram depicting a receiver according to the embodiment.

The receiver regarding the present embodiment will be explained with reference to FIG. 9. The receiver comprises a receive antenna 201, an analog receiver unit 202, a reference single generator 205, a correlator 206, a profile adjustment unit 207, a compensation signal generator 209, a synchronizer 204, a CP remover unit 203, FFT unit 208, a distortion compensator 210, an IFFT unit 211, a data sequence demodulator 212, and a user data extractor 213.

The received pilot signal and the received data signal received by the receive antenna 201 are forwarded to the following analog receiver unit 202. The analog receiver unit 202 converts the received signal of a ratio frequency into a baseband signal. The received signal converted into the baseband signal is forwarded to the CP remover unit 203, synchronizer 204 and correlator 206.

The synchronizer 204 obtains a CP position by mainly using the pilot signal and supplies information on the CP position to the CP remover unit 203.

The reference signal generator 205 generates a reference signal to be used by the correlator 206. The reference signal is a signal to calculate correlation between the reference signal and the received signal by means of the correlator 206, and in the embodiment, it is a pilot source signal cyclically shifted by the times $\tau_1$, and $\tau_3$, namely, the transmitted first and second pilot signals 16 and 18.

The correlator 206 performs correlation calculation between the pilot signals (received pilot signals) during reception and the reference signal generated from the generator 205 to obtain mutual correlation values. The correlation calculation process produces the aforementioned first and second impulse responses. The correlator 206 will be described in detail below. The mutual correlation values calculated by the correlator 206 are supplied to the profile adjustment unit 207.

Figure 7:
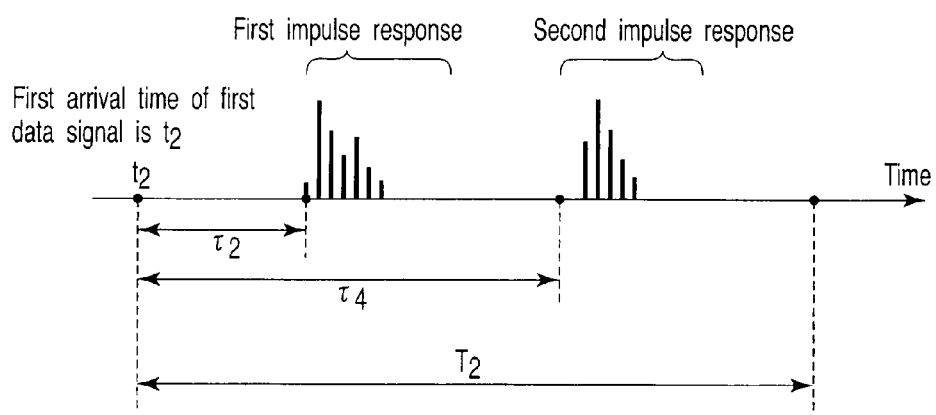
FIG. 7 is an exemplary view depicting the detail of the receiving process in the embodiment.

The profile adjustment unit 207 generates impulse responses for compensation to compensate the distortion in the data signals in accordance with the method described in FIG. 7 from the mutual correlation values obtained by the correlator 206, namely, from the first and second impulse responses. The generated impulse responses for compensation are applied to the compensation signal generator 209.

The signal generator 209 converts the impulse responses obtained from the adjustment unit 207 into a compensation signal for a distortion compensation process. In the embodiment, frequency domain equalization being used, the compensation signal generation process becomes an FFT process. The compensation signal generated from the generator 209 is forwarded to the distortion compensator 210.

The CP remover unit 203 removes the CP from the received signal, and extracts a signal block therefrom to supplies it to the FFT unit 208.

The FFT unit 208 converts the signal block from which the CP is removed into the signal in a frequency range to apply it to the distortion compensator 210. The compensator 210 mainly compensates the distortion in the data signal due to the channel. That is, the compensator 210 performs the distortion compensation by multiplying a reverse response of the compensation impulse response to the data signal.

In the system using the CDD like this embodiment, the distortion compensator 210 further treats a process to recover the delay due to the cyclic shift. To perform the distortion compensation, for instance, a well known algorithm, such as a zero forcing (ZF) method, a least square (LS) method, or a minimum mean square error (MMSE) method may be utilized.

In such a case, the system may recover the cyclic shift by performing the distortion compensation though the use of the sum of the impulse responses which have been cyclically shifted by the same cyclic shift amount of the first and second data signals 16 and 18, namely, through the use of the compensation impulse response obtained by the profile adjustment unit 208.

The IFFT unit 211 converts the compensated spectrum output from the distortion compensator 210 into the signal in the time range to supply it to the data sequence demodulator 212. The demodulator 212 demodulates the data sequence by using the demodulation scheme which has decided between the demodulator 212 and the transmitter 1. The demodulated signal is forwarded to the user data extractor 213. The extractor 213 demodulates of error correction codes to the reception data sequence obtained from the demodulator 212 to extract the user data 214.

Next, a concrete example of the reference signal generator 205, correlator 206, and profile adjustment unit 207 shown in FIG. 9 will be given accounts by referring to FIG. 10.

The reference signal generator 205 generates the same signal as the first pilot signal generated on the transmitter side by a first pilot signal generator 2051, and generates the same signal as the second pilot signal generated on the transmitter side by a second pilot signal generator 2052. That is, the first pilot signal generator 2051 generates a signal cyclically shifted the pilot source signal 15 by the time $\tau_1$, and the second pilot signal generator 2052 generates a signal cyclically shifted the pilot source signal 15 by the time $\tau_3$.

The first and the second pilot signals generated from the signal generator 205 in this way are supplied to the correlator 206. The correlator 206 has a first matched filter 2061 and a second matched filter 2062. By the first matched filter 2061 setting the first pilot signals to a tap coefficient, a first mutual correlation value between the first pilot signal and a pilot signal (received pilot signal) in a received signal 221 is obtained. The first mutual correlation value represents the first impulse response in the first channel. Similarly, by the second matched filter 2062 setting the second pilot signal as a tap coefficient, a second mutual correlation value between the second pilot signal and the received pilot signal is obtained. The second mutual correlation value represents the second impulse response in the second channel.

Two output signals (mutual correlation values) from the correlator 206 are input to the profile adjustment unit 207. The adjustment unit 207 has a first delay unit 2071 and a second delay unit 2072. The first delay unit 2071 delays the output (first impulse response) from the first matched filter by $\tau_2-\tau_1$, and the second delay unit 2072 delays the output (second impulse response) from the second matched filter by $\tau_4-\tau t_3$. The outputs from the delay units 2071 and 2072 are added by an adder 2073. That summing an impulse response for first compensation and an impulse response for second compensation produces an impulse response for third compensation 223 to compensate the data signal in distortion.

Next, another specific example of the reference signal generator 205, correlator 206 and profile adjustment unit 207 shown in FIG. 9 will be explained with reference to FIG. 11.

Similar to the aforementioned example, the signal generator 205 generating one sequence to be used by the correlator 206 to calculate the mutual correlation value, the time length of the output signal has become twice in comparison to the forgoing example. That is, the signal generator 205 outputs a pilot source signal repeatedly generated from a pilot source signal generator 2053 twice through a repeater 2054.

In the correlator 206, the third matched filter 2063 produces a mutual correlation between the twice repeated signal of the pilot source signal generated from the signal generator 205 and the pilot signal in the received signal. The third matched filter 2063 has a tap twice as longer than the pilot source signal and the tap coefficient becomes one made by repetitions of two times of the pilot source signal.

The sequence in which the pilot source signal is cyclically shifted for an arbitrary time period may be assumed as a part of the signal in which the pilot source signal has been repeated twice. Therefore, if the pilot signal is input to the third matched filter 2063 regardless of the cyclic shift amount, the mutual correlation value may be obtained. However, in comparison to the impulse response which occurs by inputting the pilot source signal without being applied the cyclic shift, if the pilot signal with being applied the cyclic shift by the time τ is input, the impulse response is also output with a delay by time τ.

Figure 12:
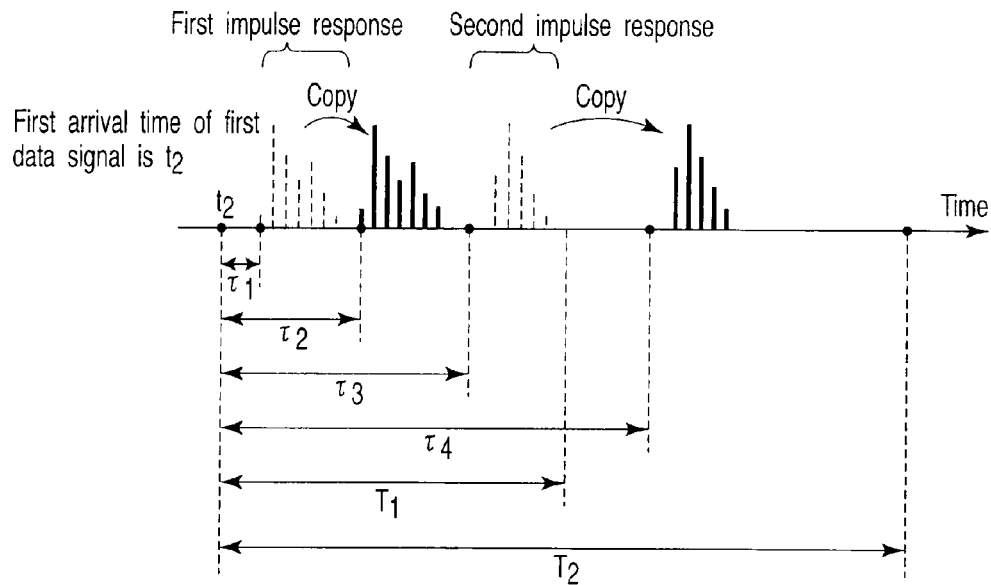
FIG. 12 is an exemplary view depicting the detail of an operation of the receiver.

Inputting received signal according to the embodiment to the correlator 206 produces impulse responses like ones shown with dot lines in FIG. 12. In other words, an impulse response in the first channel 4 through which the impulse response is delayed by time $\tau_1$, and an impulse response in the second channel 5 through which the impulse response is delayed by time $\tau_3$ are output for the time length $T_1$.

To utilize the output from the third matched filter 2063 to compensate the distortion of the data signal, the profile adjustment unit 207 performs adjustment. In the adjustment unit 207, the output from the third matched filter 2063 is input to either a third delay unit 2076 or a fourth delay unit 2077 through a switch 2075. The switch 2075 is controlled by a switch controller 2074. The switch controller 2074 applies a control signal to the switch 2075 so that the output from the third matched filter 2063 is input to the third delay unit 2076 for the time period from the time $\tau_1$ to $\tau_1+T_3$, and the output from the third matched filter 2063 is input to the fourth delay unit 2077 for the time period from the time $\tau_3$ to $\tau_3+T_3$.

The third delay unit 2076 and the fourth delay unit 2077 delay the inputs by $\tau_2-\tau_1$ and $\tau_4-\tau_3$, respectively. An adder 2078 adds the outputs from the third and the fourth delay units 2076 and 2077.

Such operations of the third and the fourth delay units 2076 and 2077, and the adder 2079 produce the impulse responses like ones indicated with dot lines in FIG. 12. In terms of the impulse responses obtained like this manner, the positions being equivalent to the cyclic sift amounts of the data signal, the impulse responses may be utilized for the distortion compensation of the data signal.

Figure 13:
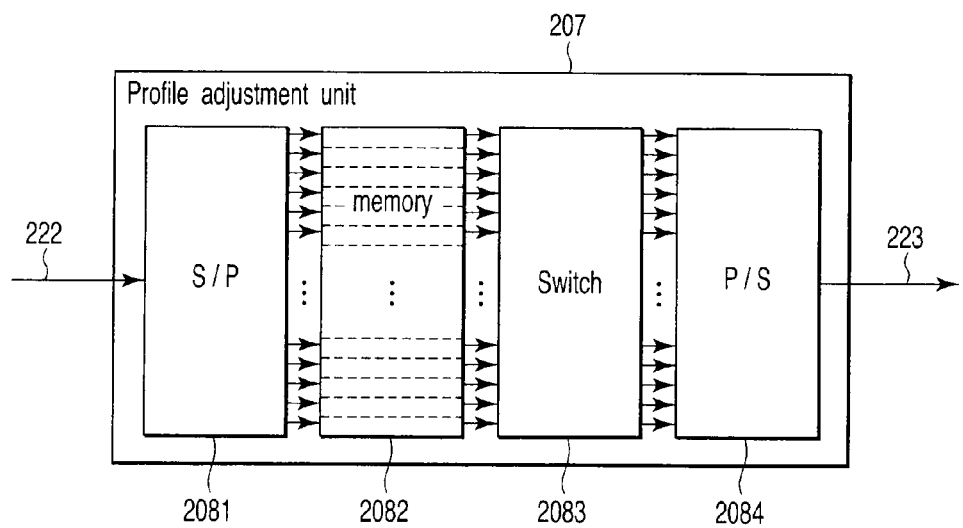
FIG. 13 is an exemplary block diagram depicting other specific example of the part of the receiver.

FIG. 13 illustrates other concrete example of the adjustment unit 207. According to FIG. 13, the output signal 222 from the correlator 206 in FIG. 11 is converted from serial data to parallel data through a serial-parallel converter (S/P) 2081. The parameter output from the S/P 2081 is stored in a memory 2082 once. On reading out data from the memory 2082, the order of the data is changed through a switch 2083, and also a part of the data is output as "0". This change in order corresponds to the operations of the third and the fourth delay units 2076 and 2077 in FIG. 11 and acts to change the cyclic shift amounts. An output signal from the switch 2083 is converted from parallel data to serial data through a parallel-serial converter (P/S) 2084. As a result, the impulse response for third compensation 223 is produced.

Figure 10:
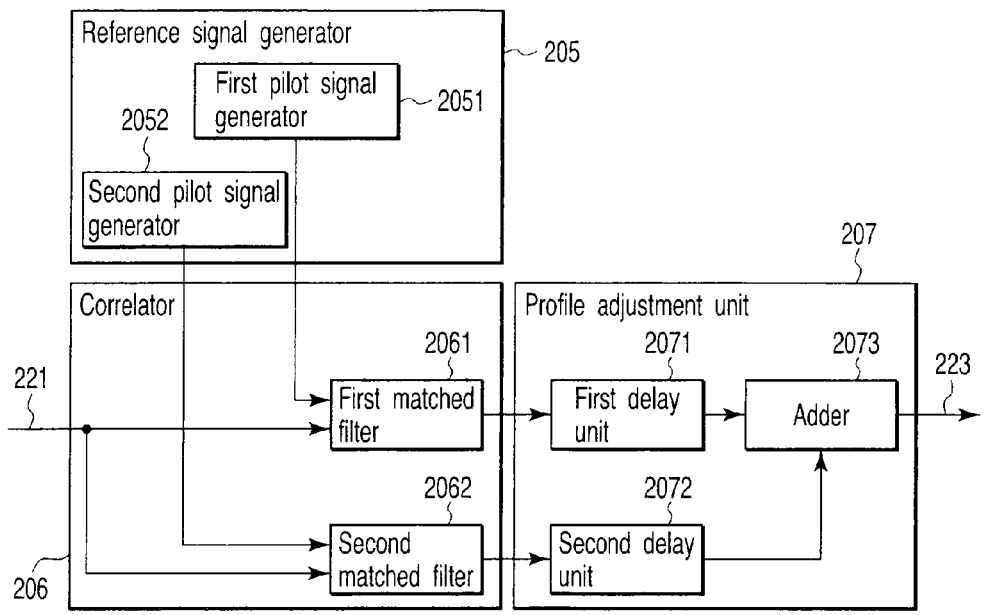
FIG. 10 is an exemplary block diagram depicting a specific example of a part of the receiver.
Figure 11:
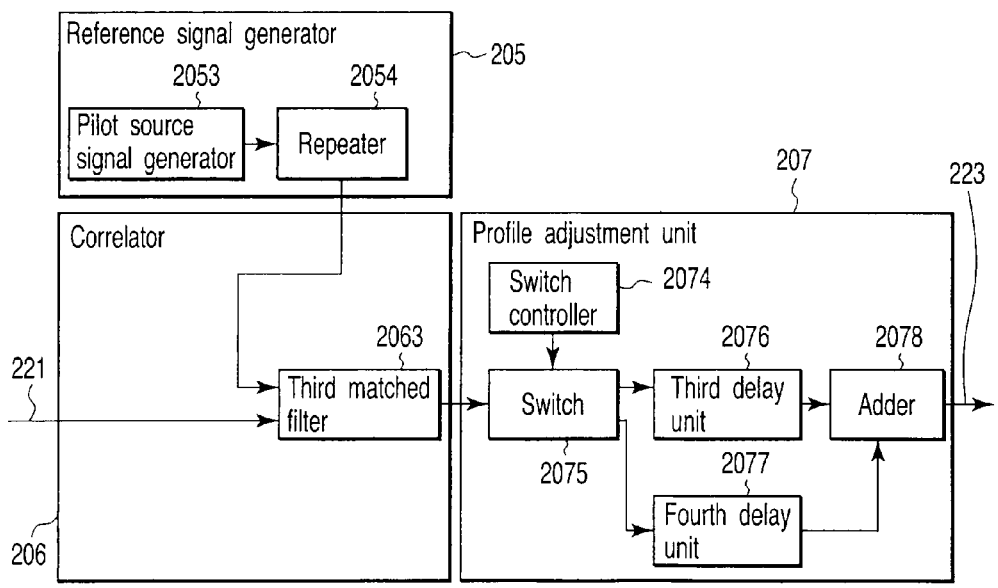
FIG. 11 is an exemplary block diagram depicting another specific example of the part of the receiver.

According to the concrete examples in FIG. 11 and FIG. 13, the configurations thereof are made simple in comparison with the concrete example in FIG. 10. In the configuration of FIG. 10, the correlator 206 should have a plurality of matched filters (in an example of FIG. 10, two matched filters 2061 and 2062). More specifically, in simultaneously receiving a plurality of pilot signals differing in cyclic shift amount, matched filters with the same numbers as the types of the sift amounts are needed. In contrast, in FIG. 11, the length of the matched filter becoming twice, only one matched filter (third matched filter 2063) is possible to respond for any sift amount. Therefore, a circuit size of the receiver may be decreased, so that the consumption power in operation may be reduced as well as the receiver is easily mounted.

(Frame Configuration)

FIG. 4 shows an example of a frame configuration in the embodiment. A frame is 10 msec long, and divided into 20 pieces of sub frames. One sub frame is 0.5 msec long. The sub frame is further divided into eight pieces of blocks (referred to as first to eighth transmission blocks from the top in time). CPs are added to each transmission block. The second and the seventh transmission blocks are short blocks (SB) with half of time lengths each. Here, the time length does not include the CP. The first, the third to sixth, and eighth blocks are referred to as long blocks (LBs), specifically, it is presumed that the LB has a length of 66.7 μsec, the SB has a length of 33.3 μsec, and the CP has a length of 4.13 μsec. It is supposed that the SB transits the pilot signal and the LB transmits the data signal.

The first and the second transmit antennas transmit the sub frames simultaneously, but the cyclic shift amounts of each block differs from one another between the sub frames transmitted from the both transmit antennas. Here, the difference includes the case in which one is not cyclically shifted and the other is cyclically shifted. For instance, each transmission block of the transmit signal from the first transmit antenna does not cyclically shift, and the transmit signal from the second transmit antenna cyclically shifts to halves of the LB and SB, namely, each transmission block cyclically shifts by 33.3 μsec and 16.7 μsec for the LB and for the SB, respectively. Or, the LB of the transmit signal from the first transmit antenna may be cyclically shifted by 16.7 μsec, and the SB thereof from the second transmit antenna may be cyclically shifted by 25 μsec.

(Specific Example of Data Sequence Modulation Unit and Pilot Sequence Modulation Unit)

Figure 16:
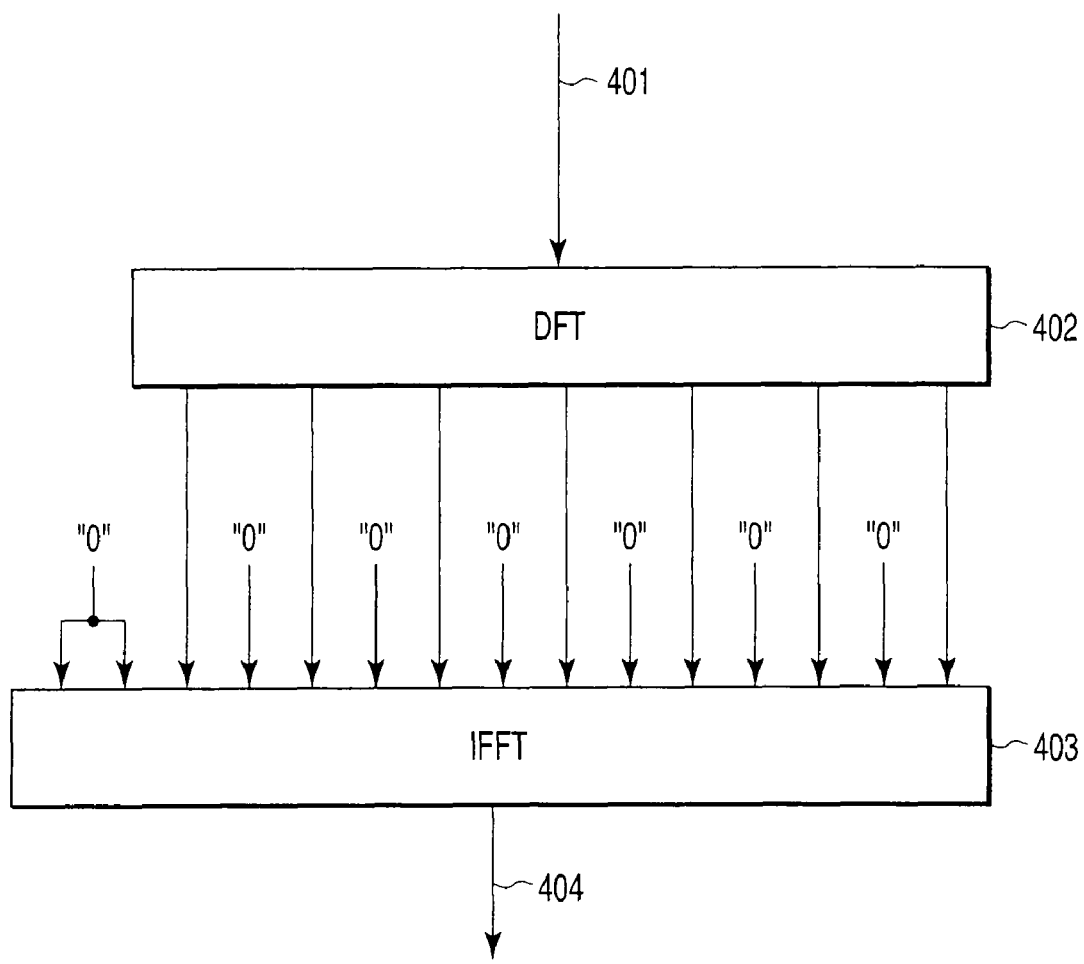
FIG. 16 is an exemplary block diagram depicting another specific example of the part of the transmitter.

FIG. 15 and FIG. 16 show detailed configuration examples of the sequence modulation unit to be used for the pilot sequence modulator 105 and the data sequence modulator 104, respectively. In FIG. 15, the sequence modulation unit converts an input signal 301 into a signal once in a frequency rang through a DFY unit 302, inputs it to an IFFT unit 303 with an IFFT size larger than the DFT size, then, the modulation unit achieves frequency conversion. The IFFT size being larger than the DFT size, the "0" is input to a part to which the output from the DFT unit 302 among the inputs to the IFFT unit 303 is not connected.

In FIG. 16, the modulation unit uses the same DFT and IFFT as those of FIG. 15, but the "0" are inserted into each frequency components in the output from the DFT unit 402 converting an input signal 401 into a signal in the frequency range, so that the output is input to an IFFT unit 403. According to FIG. 16, for instance, if the "0" are inserted into every second output from the DFT unit 402, on the time axis, the input signal 401 to the DFT unit 402 are frequency-converted and also the signal repeated twice is output from the IFFT unit 403.

Using a configuration, such as in FIG. 15 or FIG. 16, to the pilot sequence modulator 105 and to the data sequence modulator 104, a single carrier signal of an arbitrary frequency becomes possible to be generated.

(Other Embodiment)

Figure 17:
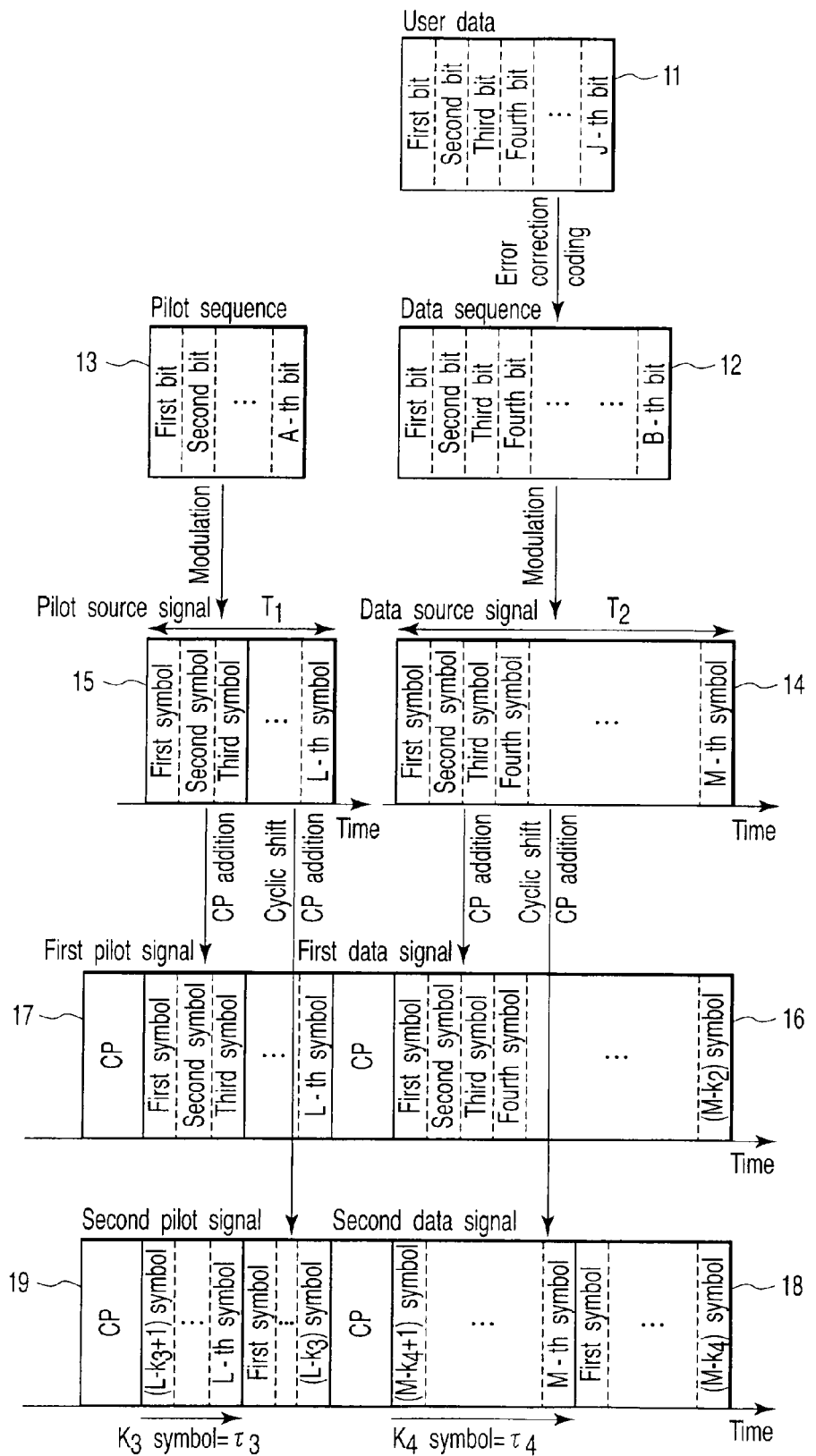
FIG. 17 is an exemplary view depicting a transmit signal generation procedure in other embodiment.
Figure 18:
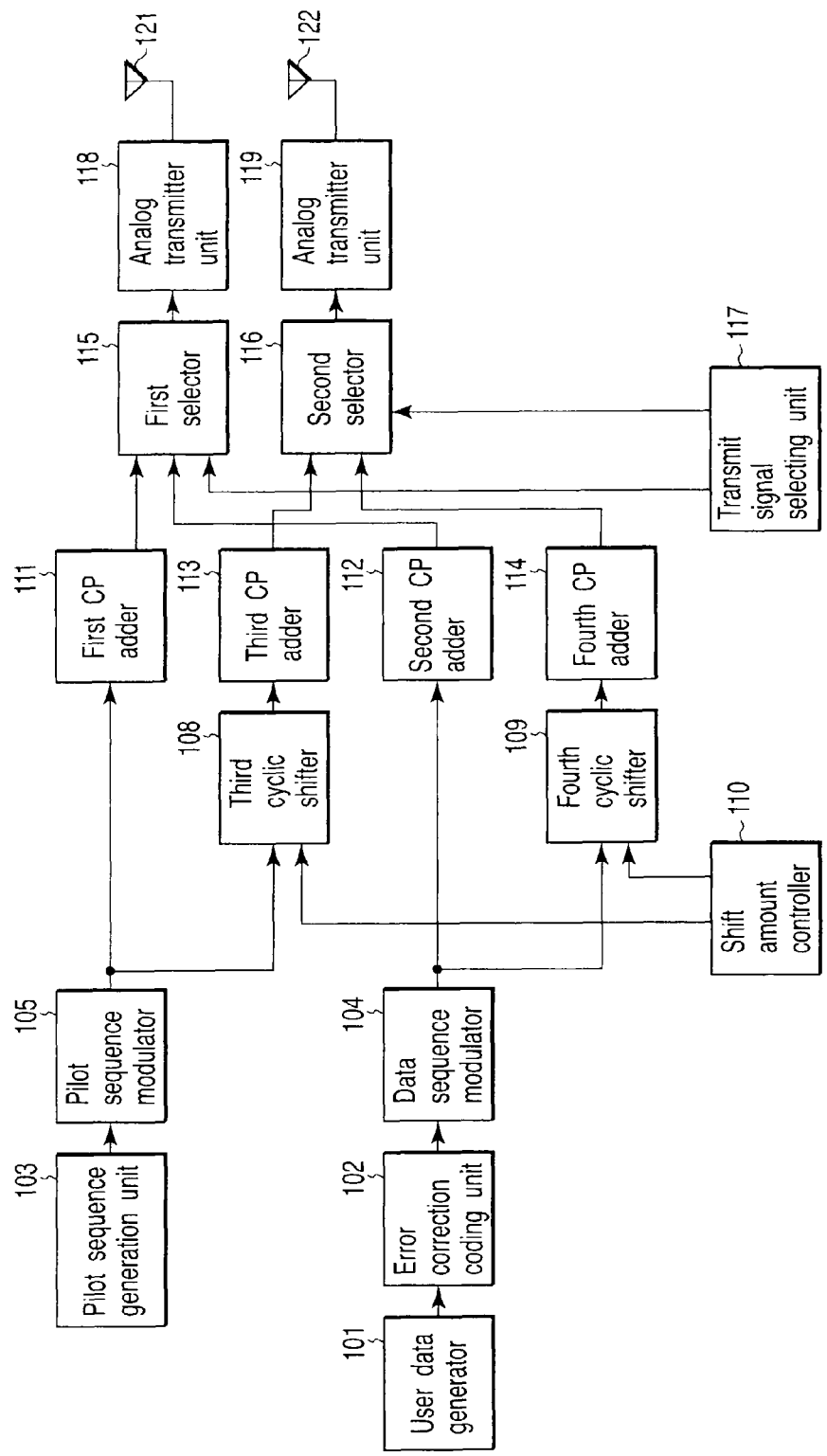
FIG. 18 is an exemplary block diagram depicting a transmitter according to other embodiment.

In succession, other embodiments will be set forth by referring to FIG. 17 and FIG. 18. FIG. 17 shows generation procedures of transmit signals in the other embodiment. In the aforementioned embodiment, as shown in FIG. 5, in generating the first pilot signal 17 and the first data signal 16, CP addition and cyclic shifts are performed to the pilot source signal 15 and the data source signal 14, respectively.

On the contrary, in FIG. 17, the embodiment does not conduct the cyclic shift, but generates the first pilot signal 17 and the first data signal 16 by conducting the CP addition to each pilot source signal 15 and the data source signal 14. That is, FIG. 17 shows an example in which the time $\tau_1$ and $\tau_2$ are set to "0".

In this case, like the foregoing embodiment, it is desirable that the cyclic shift amounts of the second pilot signal 19 and of the data signal 18 be made different from each other, and also the cyclic shift amount of the second pilot signal 19 is set smaller than time length $T_1$, and the cyclic shift amount of the second data signal is set smaller than the time length $T_2$. Thereby, like the foregoing embodiment, it becoming possible for the lengths of the pilot signals shorter, the redundant is decreased, and the transmission rate of the data signal is improved.

Further, like the aforementioned embodiment, it is preferable that the time length $T_1$ be a half of that of the time length $T_2$ or shorter and the cyclic shift amount of the second data signal 18 be a half of the time length $T_2$ or shorter.

FIG. 18 illustrates a transmitter in further other embodiment. FIG. 17 differs from FIG. 8 in that the first cyclic shifter 106 and the second cyclic shifter 107 in FIG. 8 are omitted, and the pilot source signal from the pilot sequence modulator 105 and the data source signal from the data sequence modulator 104 are directly input to the first CP adder 111 and the second CP adder 112.

Figure 6:
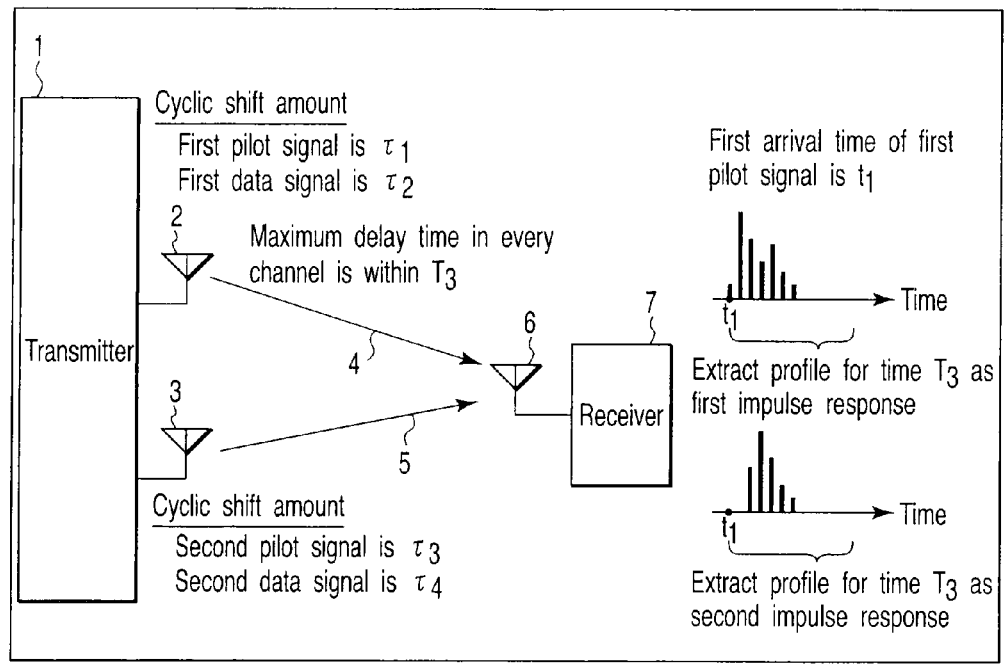
FIG. 6 is an exemplary view depicting a receiving process in the embodiment.

On the other hand, the receiver in this embodiment being basically similar to that of in FIG. 6, the configuration of the profile adjustment unit 207 differs from that of the foregoing embodiment. That is, the profile adjustment unit 207 is provided with a cyclic shifter to conduct a cyclic shift of a cyclic shift amount which is made by subtracting the cyclic amount of the second pilot signal from the cyclic amount of the second data signal in response to the second impulse response. The adjustment unit 207 sums the impulse response for second compensation and the first impulse response through the adder then obtains the final impulse for third compensation to be used for the distortion compensation of the data signal.

As mentioned above, according the embodiments, in a multi antenna wireless communication system using the CDD, shortening the pilot signal length as much as possible while enjoying the effect of the CDD enables improvement of the transmission efficiency in data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present invention is effective in a multi antenna wireless communication system such as in mobile communication system.

What is claimed is:

1. A transmitter comprising:
a first antenna;
a second antenna;
a generator configured to generate a first sequence, a second sequence, a first block signal, and a second block signal, the first sequence used for estimating a first channel condition, the first sequence being the same as a sequence obtained by performing a first cyclic shift on a CAZAC sequence, an amount of the first cyclic shift being a first amount, the second sequence used for estimating a second channel condition, the second sequence being the same as a sequence obtained by performing a second cyclic shift on the CAZAC sequence, an amount of the second cyclic shift being a second amount different from the first amount, the first block signal being the same as a signal obtained by performing a third cyclic shift on a block signal generated from data, an amount of the third cyclic shift being a third amount, the second block signal being the same as a signal obtained by performing a fourth cyclic shift on the block signal generated from the data, an amount of the fourth cyclic shift being a fourth amount different from the third amount;
wherein
a period in which the first sequence and the second sequence are transmitted differs from a period in which the first block signal and the second block signal are transmitted;
a frequency with which the first block signal and the second block signal are transmitted is set for the transmitter;
the first amount and the second amount are set for the transmitter;
a gap between the first amount and the second amount differs from a gap between the third amount and the fourth amount;
the first sequence and the first block signal are transmitted at least via the first antenna; and
the second sequence and the second block signal are transmitted at least via the second antenna.

2. The transmitter according to claim 1, wherein
the first sequence and the second sequence are generated by performing at least IFFT; and
the first block signal and the second block signal are generated by performing at least DFT and IFFT.

3. The transmitter according to claim 1, further comprising an error correction coding unit configured to perform error correction coding on the data.

4. The transmitter according to claim 1, wherein a modulation scheme is applied to the data, the modulation scheme corresponding to a demodulation scheme employed in a terminal to communicate with.

5. The transmitter according to claim 1, further comprising an adding unit configured to add a cyclic prefix to the first sequence, the second sequence, the first block signal, and the second block signal.

6. The transmitter according to claim 1, wherein the first sequence, the second sequence, the first block signal, and the second block signal are single carrier signals.

7. The transmitter according to claim 1, further comprising
a first transmission analog circuit coupled to the first antenna; and
a second transmission analog circuit coupled to the second antenna,
wherein
the first transmission analog circuit converts, into a first signal of a radio frequency, the first sequence and the first block signal, and outputs the first signal to the first antenna; and
the second transmission analog circuit converts, into a second signal of a radio frequency, the second sequence and the second block signal, and outputs the second signal to the second antenna.

8. The transmitter according to claim 1, further comprising a user data generator configured to generate a user data, wherein the data is generated based on the user data.

9. A receiver for receiving signals from a transmitter, comprising:
a receiving antenna; and
a receiver configured to receive a first sequence, a second sequence, a first block signal, and a second block signal, the first sequence used for estimating a first channel condition, the first sequence being the same as a sequence obtained by performing a first cyclic shift on a CAZAC sequence, an amount of the first cyclic shift being a first amount, the second sequence used for estimating a second channel condition, the second sequence being the same as a sequence obtained by performing a second cyclic shift on the CAZAC sequence, an amount of the second cyclic shift being a second amount different from the first amount, the first block signal being the same as a signal obtained by performing a third cyclic shift on a block signal generated from data, an amount of the third cyclic shift being a third amount, the second block signal being the same as a signal obtained by performing a fourth cyclic shift on the block signal generated from the data, an amount of the fourth cyclic shift being a fourth amount different from the third amount, wherein the first sequence, the second sequence, the first block signal, and the second block signal are received via the receiving antenna;

a period in which the first sequence and the second sequence are received differs from a period in which the first block signal and the second block signal are transmitted;

a frequency with which the first block signal and the second block signal are received is set for the transmitter;

the first amount and the second amount are set for the transmitter; and a gap between the first amount and the second amount differs from a gap between the third amount and the fourth amount.

10. The receiver according to claim 9, wherein the first sequence and the first block signal are transmitted at least via a first antenna of the transmitter; and the second sequence and the second block signal are transmitted at least via a second antenna of the transmitter.

11. The receiver according to claim 9, further comprising an analog circuit coupled to the receiving antenna, wherein the analog circuit converts, into baseband signals, signals of the first sequence, the second sequence, the first block signal, and the second block signal received via the receiving antenna, and outputs the baseband signals to the receiver.

12. A transmission method for use in a transmitter for transmitting signals via a first antenna and a second antenna, comprising:

generating a first sequence, a second sequence, a first block signal, and a second block signal, the first sequence used for estimating a first channel condition, the first sequence being the same as a sequence obtained by performing a first cyclic shift on a CAZAC sequence, an amount of the first cyclic shift being a first amount, the second sequence used for estimating a second channel condition, the second sequence being the same as a sequence obtained by performing a second cyclic shift on the CAZAC sequence, an amount of the second cyclic shift being a second amount different from the first amount, the first block signal being the same as a signal obtained by performing a third cyclic shift on a block signal generated from data, an amount of the third cyclic shift being a third amount, the second block signal being the same as a signal obtained by performing a fourth cyclic shift on the block signal generated from the data, an amount of the fourth cyclic shift being a fourth amount different from the third amount;

wherein a period in which the first sequence and the second sequence are transmitted differs from a period in which the first block signal and the second block signal are transmitted;

a frequency with which the first block signal and the second block signal are transmitted is set for the transmitter;

the first amount and the second amount are set for the transmitter;

a gap between the first amount and the second amount differs from a gap between the third amount and the fourth amount;

the first sequence and the first block signal are transmitted at least via a first antenna; and the second sequence and the second block signal are transmitted at least via a second antenna.

13. A receiving method for use in a receiver for receiving signals via a receiving antenna from a transmitter, comprising:

receiving a first sequence, a second sequence, a first block signal, and a second block signal, the first sequence used for estimating a first channel condition, the first sequence being the same as a sequence obtained by performing a first cyclic shift on a CAZAC sequence, an amount of the first cyclic shift being a first amount, the second sequence used for estimating a second channel condition, the second sequence being the same as a sequence obtained by performing a second cyclic shift on the CAZAC sequence, an amount of the second cyclic shift being a second amount different from the first amount, the first block signal being the same as a signal obtained by performing a third cyclic shift on a block signal generated from data, an amount of the third cyclic shift being a third amount, the second block signal being the same as a signal obtained by performing a fourth cyclic shift on the block signal generated from the data, an amount of the fourth cyclic shift being a fourth amount different from the third amount, wherein the first sequence, the second sequence, the first block signal, and the second block signal are received via the receiving antenna;

a period in which the first sequence and the second sequence are received differs from a period in which the first block signal and the second block signal are transmitted;

a frequency with which the first block signal and the second block signal are received is set for the transmitter;

the first amount and the second amount are set for the transmitter; and a gap between the first amount and the second amount differs from a gap between the third amount and the fourth amount.

* * * * *